Oct. 30, 1934.  O. STYLES  1,978,611
LATHE CHUCK
Filed Dec. 29, 1932   2 Sheets-Sheet 1
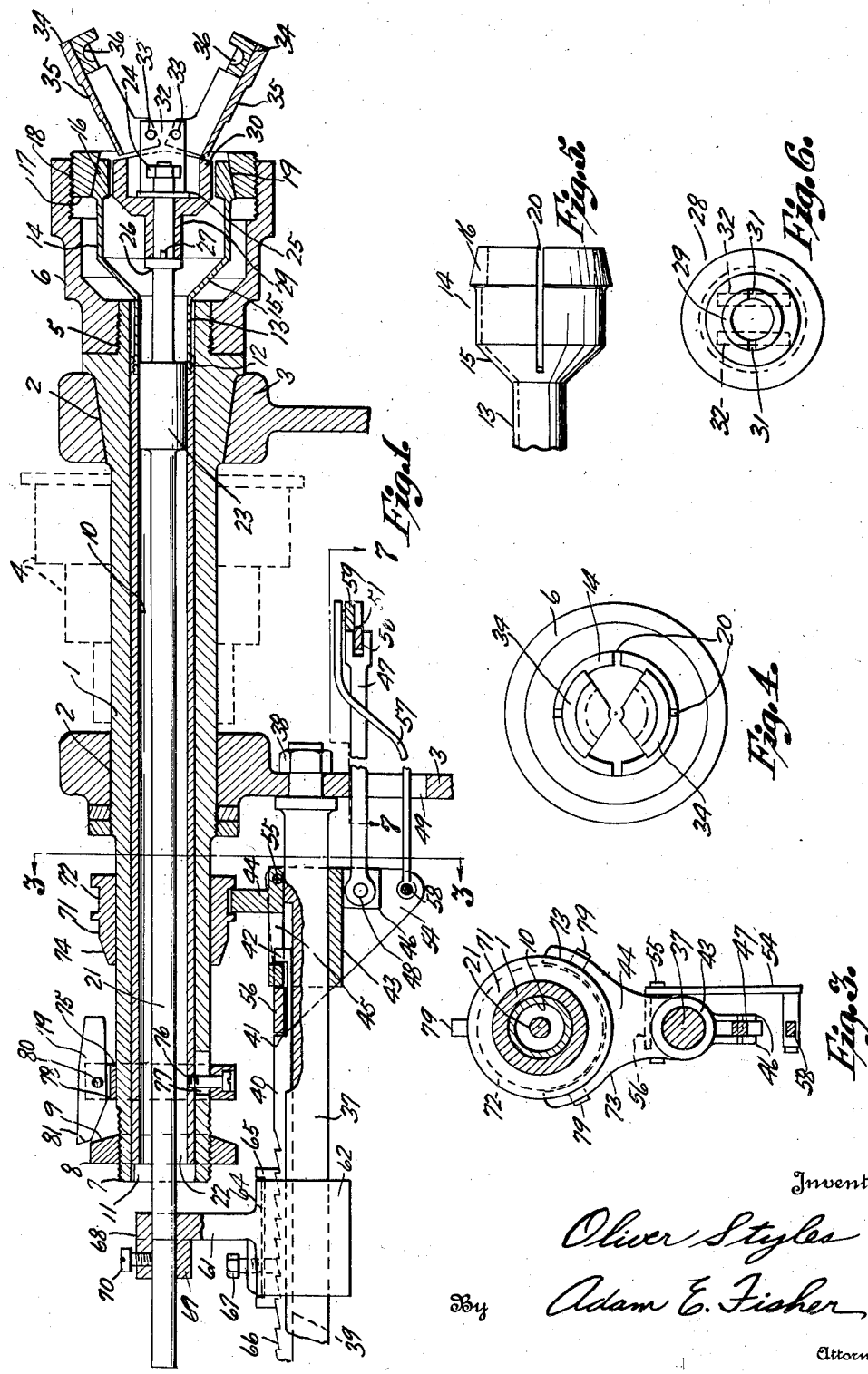
Inventor
Oliver Styles
By Adam E. Fisher
Attorney Oct. 30, 1934. O. STYLES 1,978,611
LATHE CHUCK
Filed Dec. 29, 1932 2 Sheets-Sheet 2
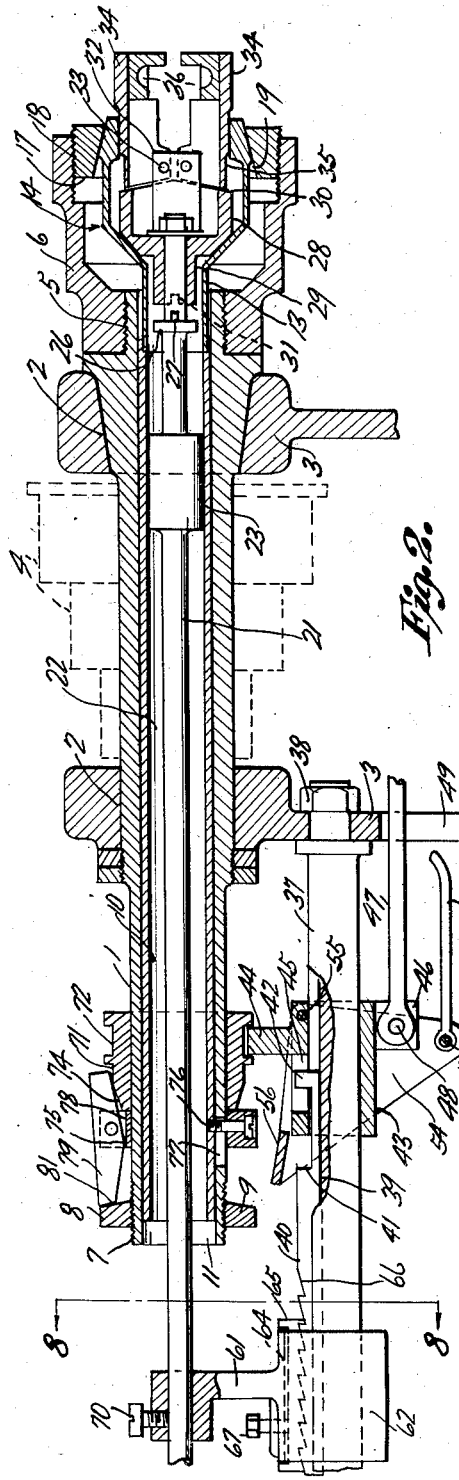
Inventor
Oliver Styles
By Adam E. Fisher
Attorney Patented Oct. 30, 1934

1,978,611

UNITED STATES PATENT OFFICE 1,978,611

LATHE CHUCK

Oliver Styles, Santiago, Chile

Application December 29, 1932, Serial No. 649,259

7 Claims. (Cl. 279—106)

This invention relates to improvements in lathe chucks.

The main object of the invention is to provide a lathe chuck so constructed as to permit the insertion and removal of work without stopping or reversing the lathe, thus greatly increasing the speed of production and facilitating the work on the lathe.

Another object is to provide a lathe chuck of exceedingly simple, durable and efficient construction and embodying an outer constantly rotating mandrel, an inner sleeve and a slide rod, chuck jaws connected to the slide rod and operable to press together on the work or release the same by an axial movement of the slide rod and controlling and operating mechanism for releasing the chuck from the rotating mandrel during the insertion or removal of work.

Another object is to provide a chuck of this character including an operating mechanism which may be conveniently and safely operated with one hand thus leaving the operator's other hand free to handle the work.

With these and other objects and advantages in view the invention resides in the novel construction and arrangement of parts as hereinafter set forth and claimed reference being had to the accompanying drawings wherein a preferred embodiment of the invention is illustrated for exemplification and wherein:

Figure 1 is a longitudinal section through the chuck showing the jaws opened for the insertion of the work.

Figure 2 is a view similar to Figure 1 but showing the jaws closed and showing the operating levers removed.

Figure 3 is a section along the line 3—3 in Figure 1.

Figure 4 is an end view of the work receiving end of the chuck.

Figure 5 is a detached fragmental elevation of the chuck jaw clamp collet.

Figure 6 is an enlarged and detached rear or inner end view of the chuck jaw carrier.

Figure 7 is a section along the line 7—7 in Figure 1.

Figure 8 is a section along the line 8—8 in Figure 2.

Figure 9 is a view similar to Figure 8 but showing an alternative form of construction.

Referring now more particularly to the drawings the reference numeral 1 designates the tubular lathe mandrel journaled at 2 in the usual bearings 3 and rotated in conventional manner by a belt (not shown) running over the cone or step pulleys 4. At one end the mandrel 1 is reduced and threaded at 5 and a diametrically enlarged head 6 is threaded thereon, this end of the device as a whole being hereinafter referred to as the forward end for convenience in description. At its rear end the mandrel is threaded at 7 and a nut 8 is threaded thereon, the forwardly disposed face 9 of this nut being beveled or angularly cut as shown and for a purpose to be set forth.

A sliding sleeve 10 is slidably mounted in the bore 11 of the mandrel 1 to rotate therewith and extends substantially from end to end thereof, the forwardly disposed end of the sleeve being threaded at 12 to receive the rear tubular end 13 of the clutch jaw clamping collet 14. Adjacent the end of the mandrel 1 this collet 14 is flared outwardly at 15 and extended for some distance to terminate in an angular shoulder or rim 16 adapted to coact with a clamping ring 17 threaded at 18 in the end of the mandrel head 6 and having its inner periphery complementarily beveled as at 19. The collet 14 is split at diametrically opposite points at 20 from its flared portion 15 outward to its forward end. It will be evident that by this construction a forward axial movement of the sleeve 10 will through the coaction of the collet shoulder 16 and ring 17 constrict the collet and a reverse movement will allow the collet to expand through its inherent resiliency. The collet is of course made of spring material for this purpose.

A slide rod or spindle 21 is slidably and rotatably mounted in the bore 22 of the sleeve 10, the said rod being preferably, though not necessarily of somewhat smaller diameter than this bore 22 and being held in alignment therewith by a diametrically enlarged portion 23. At its front end the slide rod 21 is provided with a nut 24 and washer 25 and spaced inwardly therefrom a rigid and preferably integrally formed collar or shoulder 26. Lock lugs 27 are provided on the front face of this collar 26 at diametrically opposite points. The chuck jaw carrier 28 comprises a tubular neck 29 and an outwardly flared portion or mouth 30, the said neck being rotatably and slidably mounted on the slide rod 21 between the washer 25 and collar 26 and being of such length as to play freely and axially on the slide rod between these elements. Notches 31 are cut at diametrically opposite points in the rear annular face of the neck 29 to receive the said lock lugs 27 on the collar 26. In practice the slide rod 21 is held rigidly against rotation with the mandrel 1 and sleeve 10 and hence when this rod is moved forwardly in the sleeve the lock lugs 27 will enter the notches 31 and hold the chuck carrier 28 against rotation allowing work to be removed from or inserted in the chuck which of course is in its opened position at this time.

A pair of spaced parallel ears 32 are extended forwardly from the carrier 28 at each side of the bore through the neck 29 thereof and these ears are provided adjacent their outer or forward ends with apertures 33. The chuck jaws 34 of which two are employed comprise the arcuate shells 35 and the outer work gripping elements 36, the said jaws being hinged at their inner ends to the jaw carrier 28 by pins passed through the apertures 33 in the ears 32. When in their closed position the jaws fit within the outer shoulders 16 of the collet 14 and hence will be pressed tightly together on the work when the collet is constricted thereon as aforesaid.

A shaft 37 is secured by a nut 38 as shown to the rear bearing 3 and extends rearwardly therefrom beneath the mandrel 1 and in parallelism therewith. From a point adjacent its forward end to its rearward extremity the shaft 37 is provided with a key way 39 along its upper edge or face and a key 40 is slidably mounted in this key way. The key 40 is of sufficient height to project upwardly from the key way 39 and has a groove 41 in its upper face adjacent its forward end forming a head 42 as shown. A sliding sleeve 43 is slidably mounted on the shaft 37 and carries an upwardly extended yoke 44 and is slotted rearwardly thereof as at 45 to receive the said head 42 on the key 40. Beneath the yoke 44 and diametrically opposite therefrom spaced bearing ears 46 are depended from the sleeve 43 and an operating rod 47 is hinged by a pin 48 between these ears and extended forwardly therefrom through an aperture 49 in the rear bearing 3. At its forward end the rod 47 is pivoted at 50 to an operating lever 51 which is pivotally attached at 52 to a bracket 53 carried by the bearing 3. A triangular latch plate 54 is pivoted by its upper corner at 55 to the sleeve 43 and at its rearwardly disposed corner bears a laterally extended latch key 56 which is adapted normally to lie in the groove 41 in the key 40 between the rear end of this groove and the rear end of the sleeve 43. A link 57 is pivoted at 58 to the lower corner of the latch plate 54 and extends through the aperture 49 in the bearing 3 and is connected at its forward end to an auxiliary lever 59 fulcrumed at 60 on the main operating lever 51. By this construction it will be apparent that a movement of the free end of the operating lever 51 to the left or rearwardly will slide the sleeve 43 and the key 40 rearwardly along the shaft 37.

A connecting block 61 is provided and has at its lower end a hub 62 with a bore 63 adapted to fit over the shaft 37 and having in its upper margin a recess 64 in which is mounted a pawl plate 65 toothed to engage the toothed upper margin 66 of the key 40 adjacent the rear end thereof. The plate 65 is pressed into engagement with the key 40 by a set screw 67 and of course the block 61 may be adjusted axially along the shaft 37 by loosening this screw. At its upper end the block 61 has a hub 68 with a bore 69 to receive the rearwardly extended end of the slide rod 21 to which it is secured by a set screw 70. Thus the rearward movement of the sliding sleeve 43 and the key 40 will be transmitted to the slide rod 21 and will pull the same rearwardly through the sleeve 10 pulling the lock lugs 27 out of the notches 31 and freeing the chuck jaw carrier 28 from the rod 21.

A cam collar 71 is slidably mounted on the rear end portion of the mandrel 1 and has a peripheral groove 172 to receive the forks 73 of the yoke 44 and is beveled or tapered at its rear end as shown at 74. A band 75 is slidably mounted on the mandrel some distance rearwardly of the cam collar 71 and is rigidly connected to the sliding sleeve 10 by a screw 76 passing inwardly through the band and threaded in the said sleeve. A longitudinal sliding play of the band 75 and the sleeve 10 is permitted by a longitudinal slot 77 in the mandrel 1 through which the screw 76 passes. The band 75 is provided with equispaced slots 78 in which operating fingers 79 are fulcrumed as shown at 80. At their rear ends the fingers 79 are angularly cut at 81 to coact with the angular face 9 of the nut 8 aforesaid. A modification of the connecting block 61 is shown in Figure 9 in which it is provided at its upper end with a split clamp to receive a split bearing 82 which slips over the slide rod 21 and which is clamped in place by a set screw 83.

In operation and with the chuck jaws 34 pushed outward and opened the work is inserted between the jaws and the main operating lever is moved to the left pulling the slide rod 21 rearwardly and drawing the chuck jaw carrier 28 inward and closing the chuck jaws on the work, the carrier being at the same time released by the disengagement of the lock lugs 27 from the notches 31 as aforesaid. The jaw carrier 28 and the jaws 34 are thus free to rotate with the mandrel 1. The auxiliary lever 59 is then swung to the right by the hand grasping the lever 51 thus swinging the latch plate 54 on its pivot 55 and raising the latch lug 56 out of the groove 47 in the key 40 as shown in Figure 2. The main operating lever 51 is then swung further to the left sliding the cam collar 71 along the mandrel and forcing its beveled rear end 74 under the ends of the fingers 79 and swinging their opposite angular ends 81 inward against the angular face 9 of the nut 8. The band 75 is thus forced forwardly and carries the sliding sleeve 10 along forcing the shoulder 16 of the collet 14 into the clamping ring 17 and clamping the said collet on the jaws 34 and the work therein. The work is thus firmly held in place during the required time. To return the jaws to their opened position the procedure outlined is simply reversed as will be readily understood. The collet 14 must have sufficient resiliency or elasticity and the angle of the engaging faces of this collet and the clamping ring 17 must be great enough to allow the collet to release the jack carrier 28 the instant pressure is removed. This elasticity may be supplemented by additional and separate springs if necessary. The operation may also be reversed and the collet caused to grip the jaws upon an inward movement instead of the outward movement herein outlined if so desired only minor changes considered within the scope of the present invention being necessary to accomplish this reversing. As the jaws 34 emerge from the body of the chuck they will possess sufficient momentum to open by centrifugal force and so eject the work automatically. As a further modification the slide rod 21 may be allowed to rotate with the sleeve 10 and mandrel 1 if so desired, the connecting block 61 illustrated in Figure 9 due to its provision of a bearing 82 being for use in this case.

Further modifications and advantages will be apparent to those skilled in the art.

While I have herein set forth a certain preferred embodiment of my invention it is understood that I may vary from the same in minor structural details so as best to construct a practical device for the purposes intended, not departing from the spirit of the invention and within the scope of the appended claims.

I claim:

1. In a chuck, a mandrel, a clamping ring therein, a spring collet slidably mounted in the mandrel, a slide rod slidably mounted in the mandrel, and chuck jaws connected to the slide rod and adapted to be gripped by the collet.

2. In a chuck, a mandrel, a clamping ring therein, a spring collet slidably mounted in the mandrel, a slide rod slidably mounted in the mandrel, and chuck jaws connected to the slide rod and adapted to be gripped by the collet, and means for independently operating the said collet and slide rod to clamp the clutch jaws or release them and force them outwardly.

3. In a chuck, a rotating mandrel, a sleeve slidably mounted in the mandrel to rotate therewith, a spring collet connected to the sleeve, a slide rod slidably mounted through the sleeve, a chuck jaw carrier, chuck jaws hinged to the carrier, and means for rotatably connecting the said jaw carrier and slide rod, and means for locking the jaw carrier against rotation.

4. In a chuck, a rotating mandrel, a clamping ring therein, a sleeve slidably mounted in the mandrel to rotate therewith, a spring collet connected to the said sleeve and adapted to be pressed into constricting engagement with the said clamping ring by sliding the said sleeve, a slide rod slidably mounted through the said sleeve and locked against rotation therein, a chuck jaw carrier rotatably mounted on the slide rod chuck jaws hinged to the said carrier, and means for rigidly connecting the said slide rod and carrier to lock the carrier against rotation.

5. In a chuck, a rotating mandrel, a clamping ring therein, a sleeve slidably mounted in the mandrel to rotate therewith, a spring collet connected to the said sleeve and adapted to be pressed into constricting engagement with the said clamping ring by sliding the said sleeve, a slide rod slidably mounted through the said sleeve and locked against rotation therein, a chuck jaw carrier rotatably mounted on the slide rod, chuck jaws hinged to the said carrier, and means for rigidly connecting the said slide rod and carrier to lock the carrier against rotation, and operating means for independently or simultaneously sliding the said sleeve and slide rod lengthwise to clamp the collet on the chuck jaws or release the collet and force the jaws outward.

6. In a chuck, a mandrel, a head on the mandrel, a sleeve slidably mounted therein, a slide rod slidably mounted in the sleeve, a spring collet secured to the sleeve within the mandrel head, chuck jaws attached to the slide rod within the collet, the said collet and jaws being operable by reciprocating movement of the said sleeve and slide rod, a shaft slidably supported adjacent the mandrel, a key slidably mounted in the shaft, a connecting block connecting the key and slide rod, a sleeve slidably mounted on the shaft, a cam collar slidably mounted on the mandrel, a yoke connecting the said sleeve on the shaft and the cam collar, a band slidably mounted on the mandrel and secured to the said sleeve in the mandrel, arms fulcrumed on the said band, a nut secured on the mandrel and adapted to be engaged by the said arms to slide the band and sleeve forwardly, and operating means for sliding the said key and sleeve on the shaft to reciprocate the said slide rod and sleeve in the mandrel.

7. In a chuck, a mandrel, a sleeve slidably mounted therein, a slide rod slidably mounted in the sleeve, a spring collet secured to the sleeve within the mandrel, chuck jaws secured to the slide rod within the collet, the said collet and clutch jaws being operable by reciprocating movement of the said sleeve and slide rod, a shaft slidably supported adjacent the mandrel, a key slidably mounted in the shaft, a connecting block connecting the key and slide rod, a sleeve slidably mounted on the shaft, a cam collar slidably mounted on the mandrel, a yoke connecting the said sleeve on the shaft and the cam collar, a band slidably mounted on the mandrel and secured to the said sleeve in the mandrel, arms fulcrumed on the said band, a nut secured on the mandrel and adapted to be engaged by the said arms to slide the band and sleeve forwardly, and operating means for sliding the said key and sleeve on the shaft to reciprocate the said slide rod and sleeve in the mandrel, and latch means whereby the said key is released from the operating means after a certain travel.

OLIVER STYLES.